INVENTOR.
PAUL REKETTYE

July 7, 1959

P. REKETTYE 2,893,057

APPARATUS FOR ROTATIONAL CASTING OF VINYL
RESINS AND SIMILAR PLASTISOLS

Filed April 28, 1954

INVENTOR.
PAUL REKETTYE

BY

ATTORNEYS

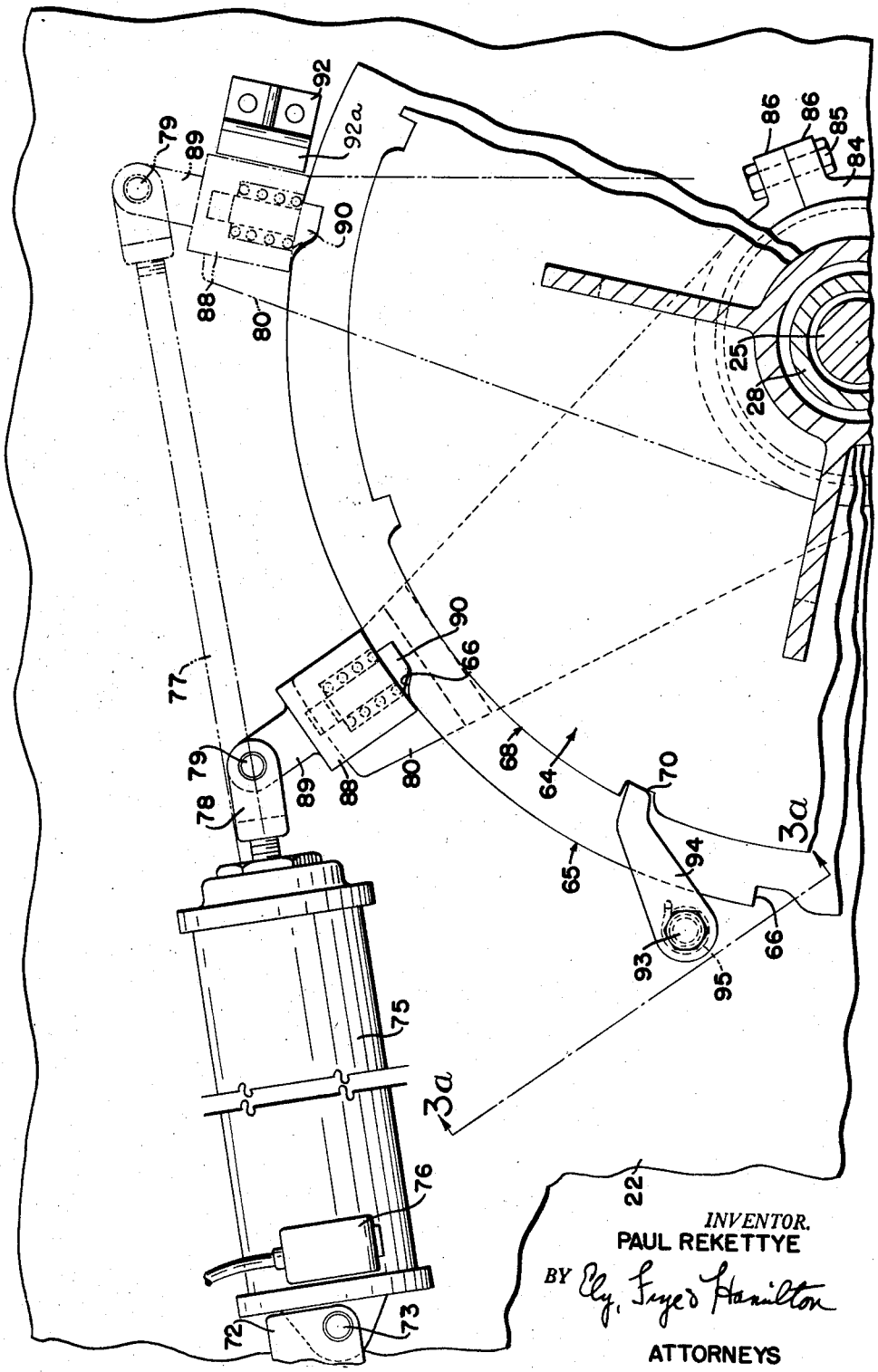

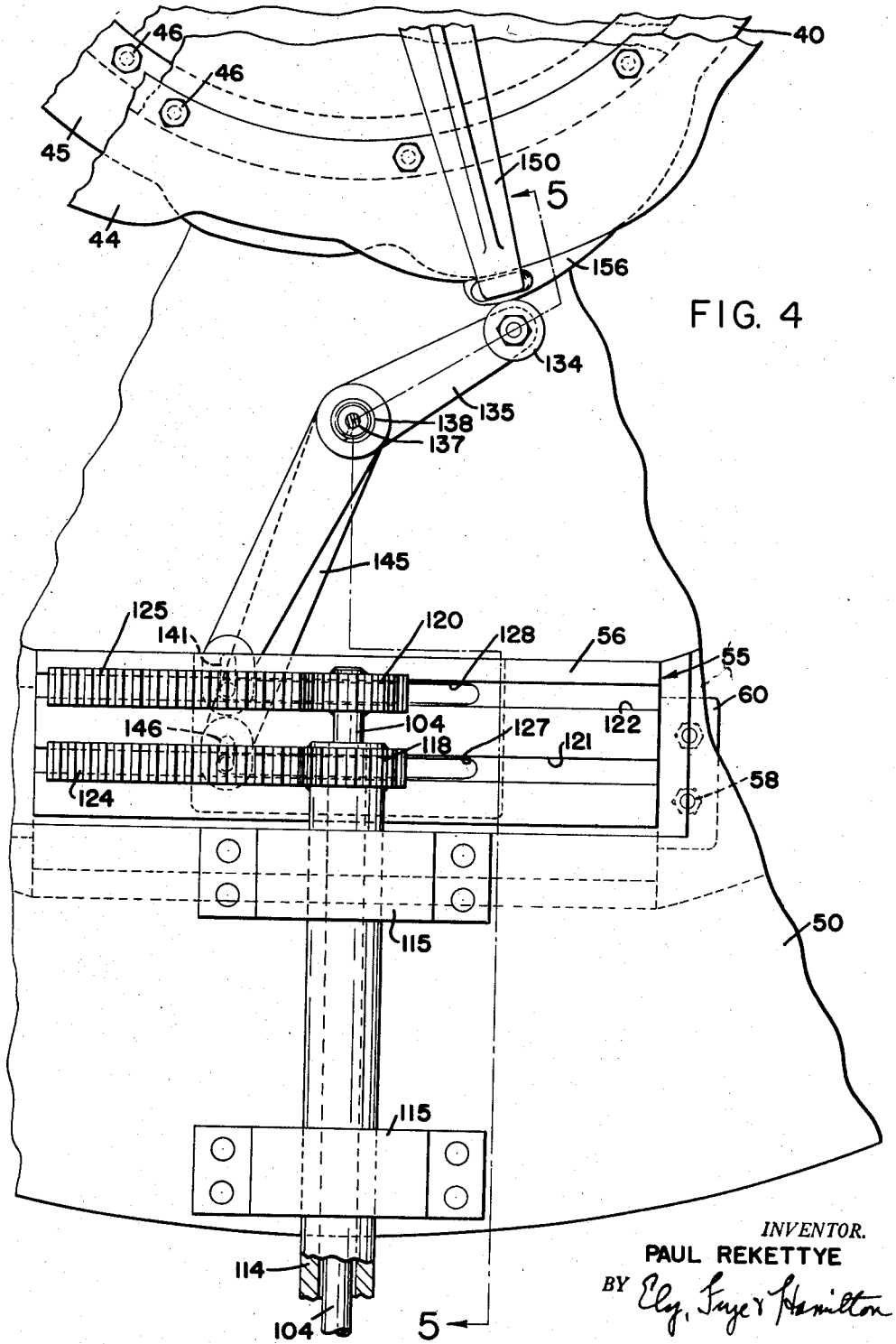

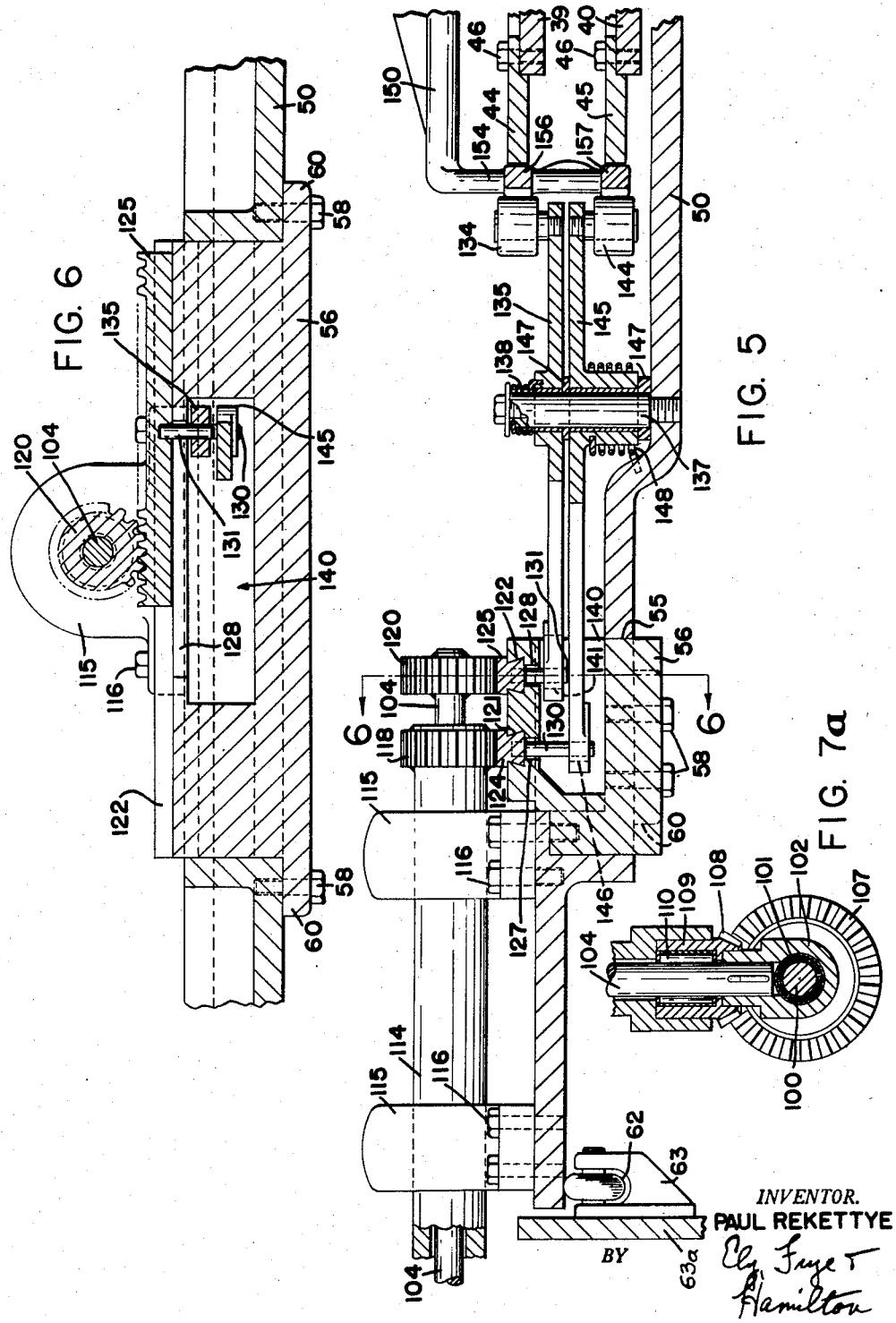

INVENTOR.
PAUL REKETTYE
BY *Ely, Frye & Hamilton*
ATTORNEYS

INVENTOR.
PAUL REKETTYE
ATTORNEYS

United States Patent Office 2,893,057
Patented July 7, 1959

2,893,057
APPARATUS FOR ROTATIONAL CASTING OF VINYL RESINS AND SIMILAR PLASTISOLS

Paul Rekettye, Akron, Ohio, assignor to The Sun Rubber Company, Barberton, Ohio, a corporation of Ohio Application April 28, 1954, Serial No. 426,164

6 Claims. (Cl. 18—26)

The present invention relates to the art of rotationally casting in hollow, non-porous molds, resins of the type which will gel and fuse upon the application of heat to the mold. This process has achieved a very great degree of commercial success following the disclosure in the United States Patent No. 2,629,134, issued to Robert P. Molitor.

Vinyl chloride copolymers plasticized with a suitable plasticizer are the most widely used of the resins employed in the process, although copolymers of vinyl chloride and vinyl acetate may be employed. Polyethylene and copolymers of vinyl chloride and vinylidene chloride and other plastisols may be used. Many different types of plasticizers may be employed, as is well known in the art.

The object of the present invention is to improve upon the apparatus for casting these materials in hollow rotating molds. The invention has been made due to difficulties in casting irregular or intricate objects in rotating molds. The casting of hollow spherical bodies or of bodies which are more or less symmetrical calls for a straight rotation of the hollow molds upon two axes while the plastisol is acquiring its set, and in such cases the plastisol will be evenly and regularly distributed over the inner surface of the mold in a substantially uniform layer.

However, in adapting the apparatus to more intricate bodies, it has been found that regular rotation upon two axes will not secure even distribution, and there may be light and heavy spots in the finished article. Also in the case of some molds, if the rotation of the mold is always in one direction on both axes, certain parts of a complex mold will not receive any or very little of the plastisol. It is also desirable in certain cases to build up a particular area of the article in which case the rotation of the mold is so controlled as to retain the pool of ungelled plastisol over any selected area so as to cause a heavier deposit in that area.

It is also desirable in certain cases to accelerate or decelerate the rotation of the mold upon either one or both axes as the plastisol gels in the mold or toward the end of the fusing period.

The invention consists in an apparatus for casting hollow articles in molds which are rotated upon two axes which will permit of all types of variations and permutations in speed and extent of rotation or oscillation to accomplish the several aims set forth above.

The invention also has as an object the devising of a machine suitable for carrying on the selective and controlled rotation or oscillation. The machine which is shown herein is a highly developed automatic machine of the turntable type in which are located a plurality of mold units, each having its own mechanism for rotating the mold. In certain of its features it follows the principles set forth in the United States Patent No. 2,629,131, issued on February 24 1953, to Martin and Rekettye, but the present machine has greater flexibility and permits of the control of the several mold carrying units to suit the particular work in hand.

In the use of the apparatus of the present invention, it is not necessary to rotate the mold in repeated cycles in the same direction on either axis, as the interior of the mold may be completely covered with the plastisol by rocking it back and forth. It is desirable to provide for the rotation of the mold on either axis over an arc somewhat in excess of 360° so as to insure complete coverage of the interior of the mold. It is recommended that about 100° over a full rotation will be found to be desirable.

It will be appreciated that considerable latitude is permissible in actual embodiments of the invention and it is not intended to restrict the invention, beyond the fair scope of the invention as set forth in the claims.

For the purpose of understanding the invention, the best known and preferred form of the apparatus is shown and will be described but the invention is not limited to details which may be modified and altered.

In illustrating the invention, a hollow mold for casting a doll body is shown and will be described as that type of mold presents many of the problems of casting which it is the purpose of the invention to overcome. The mold which is shown is rotated upon a major axis which is parallel to the vertical center line of the body and upon a minor axis which is transverse to the horizontal center line of the body.

Mechanism for opening and closing the molds and for charging them with the liquid plastisol are not shown, as such devices may be supplied and form no part of the present invention. In the drawings, the molds are shown in tandem for the purpose of balancing each unit, but this is not essential. The machine is shown as equipped with eight units but this number may be increased or diminished. In some cases it may be found desirable to pre-heat the molds before loading them with the plastisol and mechanism is shown for that purpose, although it may be omitted.

In the drawings, in which the best known embodiment of the invention is shown,

Fig. 3 is a horizontal section on the line 3—3 of Fig. 2, showing the mechanism for advancing the turntable through its successive stages.

Fig. 4 is a plan view of one of the units showing the cam devices for rotating the molds upon their major and minor axes. This view is taken at either the loading or unloading station when the molds are stationary.

Fig. 5 is a section on the line 5—5 of Fig. 4.

Fig. 6 is a section on the line 6—6 of Fig. 5.

Fig. 7a is a section on the line 7a—7a of Fig. 7.

Figure 8:
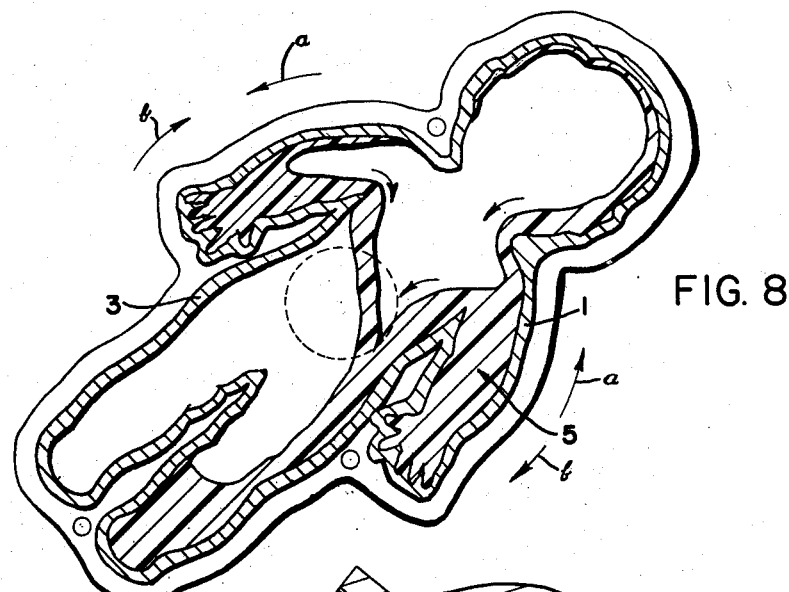
Fig. 8 is a section through the doll mold which has been selected to illustrate the intricacies of casting in a mold of complicated design. This view is taken on the line 8—8 of Fig. 7.

Referring to Fig. 8, the hollow mold for the casting of a doll is indicated at 1. It is formed of two sections 2 and 3 which are parted along the irregular line 4 which follows the widest dimension of the doll so as to avoid any overhanging or undercut formations as much as possible. The releasable mechanism for holding the two sections of the mold together is not shown. In other views the mold is shown at 1 in square configuration.

It will be seen that in a mold of this type long bays or recesses are formed to cast the arms or legs. In Fig. 8, a charge of liquid plastisol is indicated at 5. It will be observed that if this mold is rotated upon its minor axis in one direction at all times, which direction is indicated by the arrows *a* in Fig. 8, very little, if any, of the plastisol will flow in one leg, here shown as the upper leg. Similarly with other types of irregular molds, if the rotation upon the major axis is always in one direction, certain recesses or bays in the mold would receive a reduced amount of plastisol.

It has been found, therefore, that in rotationally casting irregular objects it is desirable to rotate the mold in opposite directions on both the major and minor axes; otherwise, some areas of the finished article will be light while other areas will receive a very heavy layer of the plastisol. Such a reversal of rotation is shown by the arrows *b* in Fig. 8.

As an example of the type of work which requires specially heavy layers of plastisol in certain areas, we have selected a mold for forming the head of a doll to be equipped with sleeping eyes. A sectional mold for this purpose is shown at 10. In one half of this mold are located the cores 12 which form the eye sockets. As the cores project inwardly to a substantial degree, very little of the plastisol will set over the top of the cores, causing thin spots in the layer of fused plastisol at these points.

Figure 9:
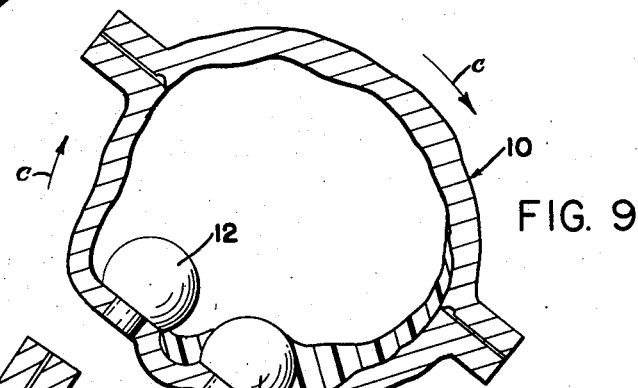
Fig. 9 is a view through a mold for casting the head of a doll, showing the casting operation about the eye sockets.
Figure 10:
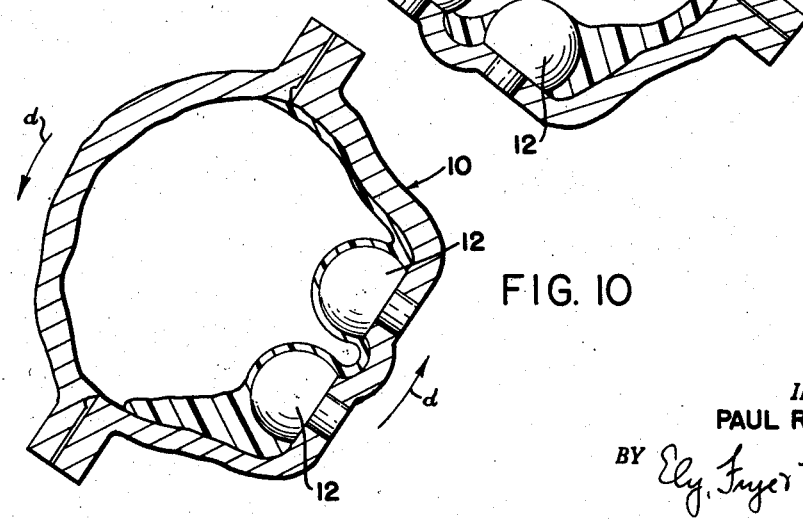
Fig. 10 is a view similar to Fig. 9 but showing another position of the mold.

This area of the mold requires a special treatment to build up an adequate wall all around the eye sockets. For this purpose it is desirable, during the casting operation, to hold down that area of the mold which has the cores 12 for a lengthened period and to rock the mold back and forth in the arc shown by Figs. 9 and 10. This will give the plastisol time to build up in and around the cores to a depth equal to the depth at other parts of the mold. Thus, in Figs. 9 and 10, the mold is shown as rocking first in the direction of the arrows *c* and then in the direction of the arrows *d*.

The process, therefore, consists in partially filling a sectional mold with a plastisol of the general type described and, while the mold is subjected to heat to gel the plastisol, rocking it in opposite directions and to varying degrees to cause the liquid plastisol to flow into all of the crevices of the mold or to maintain the pool of ungelled plastisol at the lower area for a sufficient time to cause the plastisol to set to a greater depth in the low area of the mold.

There is no fixed ratio between rotation on either the major or the minor axis in either clockwise or counter-clockwise direction. This will have to be determined by the contour and intricacies of each individual mold cavity, it being one object to obtain a uniform and even distribution over substantially all of the interior surfaces of the mold. However, when a particular area requires an especially heavy deposit of the plastisol, the holding of the mold cavity with the given area down, and the extent and speed of rocking back and forth in that position for any suitable period, will be determined by the contour and design of the object to be cast.

The machine shown herein is designed to have a maximum of flexibility so that any situation which may be presented can be adequately handled and the most desirable depth of deposit can be obtained at any point. This control is obtained by the provision of a mechanism in which the rotation or oscillation of the mold on its major axis, as well as upon its minor axis, is controlled by replaceable cams which are designed with a view to securing the desired cycles of rotation. It is reiterated, however, that the process may be carried out with other forms of machines than that to be described.

The machine is mounted upon a base 20, above which is a horizontal table 22 supported by posts 23. Rising from the base is a vertical center post 25 which is received in an aperture in the table 22 and surrounding which is the vertical rotatable sleeve or hollow shaft 28. Roller bearings 29 located at the top and bottom of the shaft 28 support it on the center post. The shaft 28 is driven by a large gear 30 below the table 22 which meshes with a drive pinion 32, on the output side of a reducing driving unit 34 which is driven by the motor 35. The mechanism just described drives the cams which control the rotation of the molds upon their major and minor axes.

On the upper end of the hollow shaft 28 is keyed a circular casting 38 having an upper ledge 39 and a lower ledge 40. The member 38 is supported upon a two-part ring 41 fixed in the shaft 28 and is held in position by a lock nut 42 threaded on the upper end of the shaft 28.

The two cams which control the rotation of the molds upon their major and minor axes are carried upon the ledges 39 and 40. The upper cam which controls the rotation of the mold upon its major axis and which is secured to the ledge 39 is given the reference numeral 44, while the lower cam which controls the rotation of the mold upon its minor axis is given the reference numeral 45. Each cam is in two or more sections which are bolted to their respective ledges by the bolts 46. The cams can be changed to suit any problems created by differing mold designs, for, after the flow of plastisol is studied, cams of selected design will be attached to the upper and lower ledges.

In the broader aspects of the invention it is possible to maintain the mold units stationary while the cams are rotated, or it is possible to rotate the molds about stationary cams. However, in the preferred form of the invention as shown herein, the molds are mounted upon a turntable which is rotated intermittently to advance the molds successively through the several stations, and the cams are rotated continuously so as to impart the compound rotary movement to the molds.

Each mold unit constitutes one or more molds, together with the mechanism for imparting rotation to the molds. The several mold units are secured to the rim of a conveyor, here shown as a turntable 50 which is rotatable about the hollow shaft 28 on roller bearings 51 which are mounted on a plate 52 secured at the center of the table 22. Roller bearings 54 are interposed between the hub of the turntable and the shaft 28. At a number of points on the turntable are formed rectangular apertures 55 in which are located removable blocks 56 which support the racks by which the molds are rotated. These blocks are secured in place by bolts 58 passing through flanges 60 in the blocks and threaded into the turntable. The outer rim of the turntable is supported upon rollers 62 located at various points about the table and where they are supported in brackets 63 attached to the inside of a wall 63*a* surrounding the machine.

Formed on the hub of the turntable below the top plate thereof, is a ledge 64 of smaller diameter having an outer rim 65 formed with a series of tooth-like notches 66 equal to the number of mold units on the turntable. Above the ledge 65 and inwardly thereof is an inner rim 68 of still smaller diameter in which are located an equal number of notches 70.

Figure 3A:
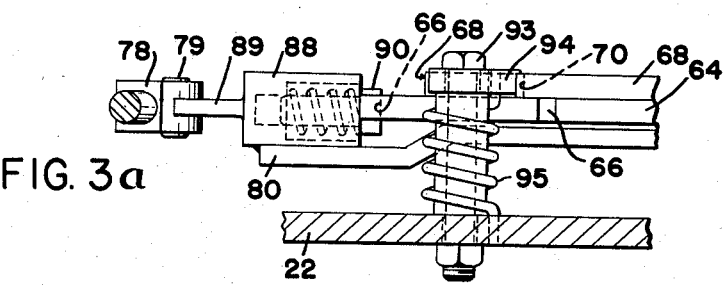
Fig. 3a is a section on the line 3a—3a of Fig. 3.
Figure 2:
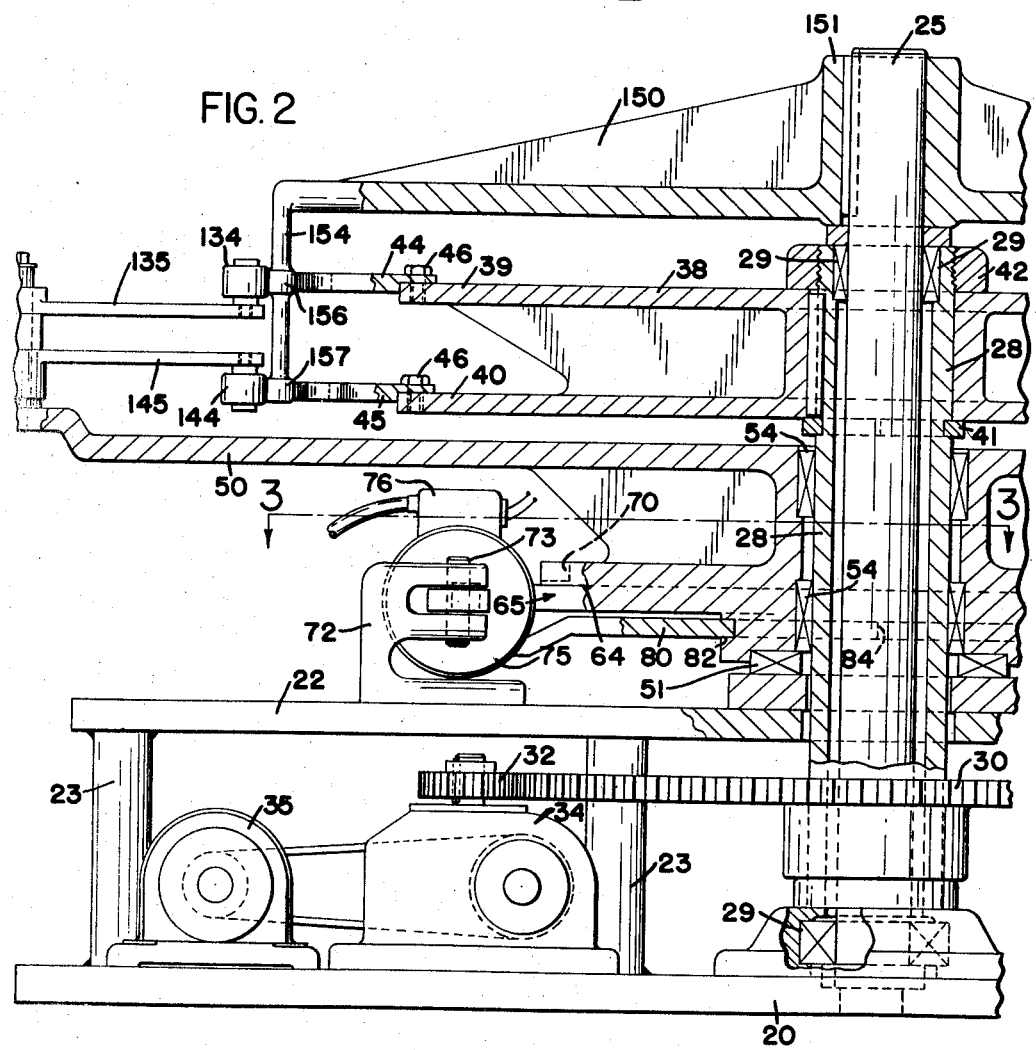
Fig. 2 is a vertical section on the line 2—2 of Fig. 1.

Located on the table 22 is a bracket 72 in which is pivoted, at 73, a fluid pressure cylinder 75, the reversing valves of which are controlled by any suitable type of control device 76 which is operated by a timer (not shown) for imparting the stroke to the piston rod 77 by which the turntable is rotated. The outer end of the piston rod is attached to a clevis 78 which is pivoted at 79 to the end of a rocking plate 80. The inner end of the plate 80 is formed in a semi-circle which fits within a circular groove 82 formed in the lower part of the hub of the turntable 50. A semi-circular collar 84 (Fig. 3) is complementary to the plate and fits in the groove 82, being clamped to the plate by the bolts 85 located in wings 86 on the plate and on the collar 84.

On the extremity of the rocking plate 80 is secured a housing 88 having a lug 89 in which the pivot 79 is located. In the housing is mounted the spring-urged pawl 90 which engages each notch 66 to advance the turntable on each full stroke of the cylinder 75. Attached to the table 22 is a bracket 92 on the vertical face of which is carried a yielding bumper 92a in the path of the arm 80 to arrest the forward stroke of the piston at the desired limit of movement of the turntable. Pivotally mounted on a post 93 rising from the table 22 is a dog 94 which overlies the rim 65 and engages the notches 70 to prevent return movement of the turntable. A coil spring 95 urges the dog 94 against the rim 68.

By the mechanism just described, the turntable is rotated intermittently to advance it through the several steps.

The mold rotating mechanism

It will be recalled that the two cams 44 and 45 are rotated continuously during the operation of the machine, which causes the molds to rotate about the two divergent axes to give the compound rotation or oscillation to the molds, which distributes the liquid plastosol over the interior of the mold during the initial gelling or setting. This rotation is preferably continued during the final fusing, although with some stocks rotation of the mold need not be continued during the final fusing operation.

Two molds 1 are shown in order to balance the unit and are supported on the end of the mold rotating mechanism. Each mold is provided with a socket 97 which is removably secured by any suitable means on seats 99 formed on the ends of a shaft 100, which constitutes the minor axis of rotation. The connection should be one by which the mold can be easily mounted and demounted, such for example as the bayonet joint indicated at 98. Shaft 100 is centrally mounted in roller bearings 101 located transversely of the end of a T-shaped sleeve 102 which is keyed to the outer end of a shaft 104 which constitutes the major axis of mold rotation. Washers 105 are located at either side of the outer end of the sleeve 102.

Keyed to the shaft 100 is a bevel gear 107 meshing with a second bevel pinion 108 which is on the outer end of a sleeve 109 which surrounds the shaft 104, roller bearings 110 being located between the sleeve and the shaft. A set screw 112 locates the sleeve 109 in a socket in the outer end of a hollow shaft 114 which surrounds the shaft 104. Shaft 114 is rotatably mounted in bearings 115 secured by bolts 116 to the outer rim of the turntable 50.

On the inner end of shaft 114 is a gear 118 and to the inner end of shaft 104, which projects beyond the shaft 114, is a second gear 120, these two gears serving to impart the rotary or oscillatory movement to the molds on their minor and major axes respectively.

The gears 118 and 120 in each mold unit are located over a block 56 in the top of which are two parallel ways 121 and 122 which are transverse to the shafts 104 and 114. In the way 121 is located a sliding rack 124 which meshes with the gear 118 and in the way 122 is a second sliding rack 125 which meshes with the gear 120. In the way 121 is a slot 127 and in the way 122 is a slot 128, and set in the underside of the rack 124 is a pin 130 which projects through its slot. A similar, but shorter, pin 131 is set in the underside of the rack 125 and projects through the slot 128.

Figure 7:
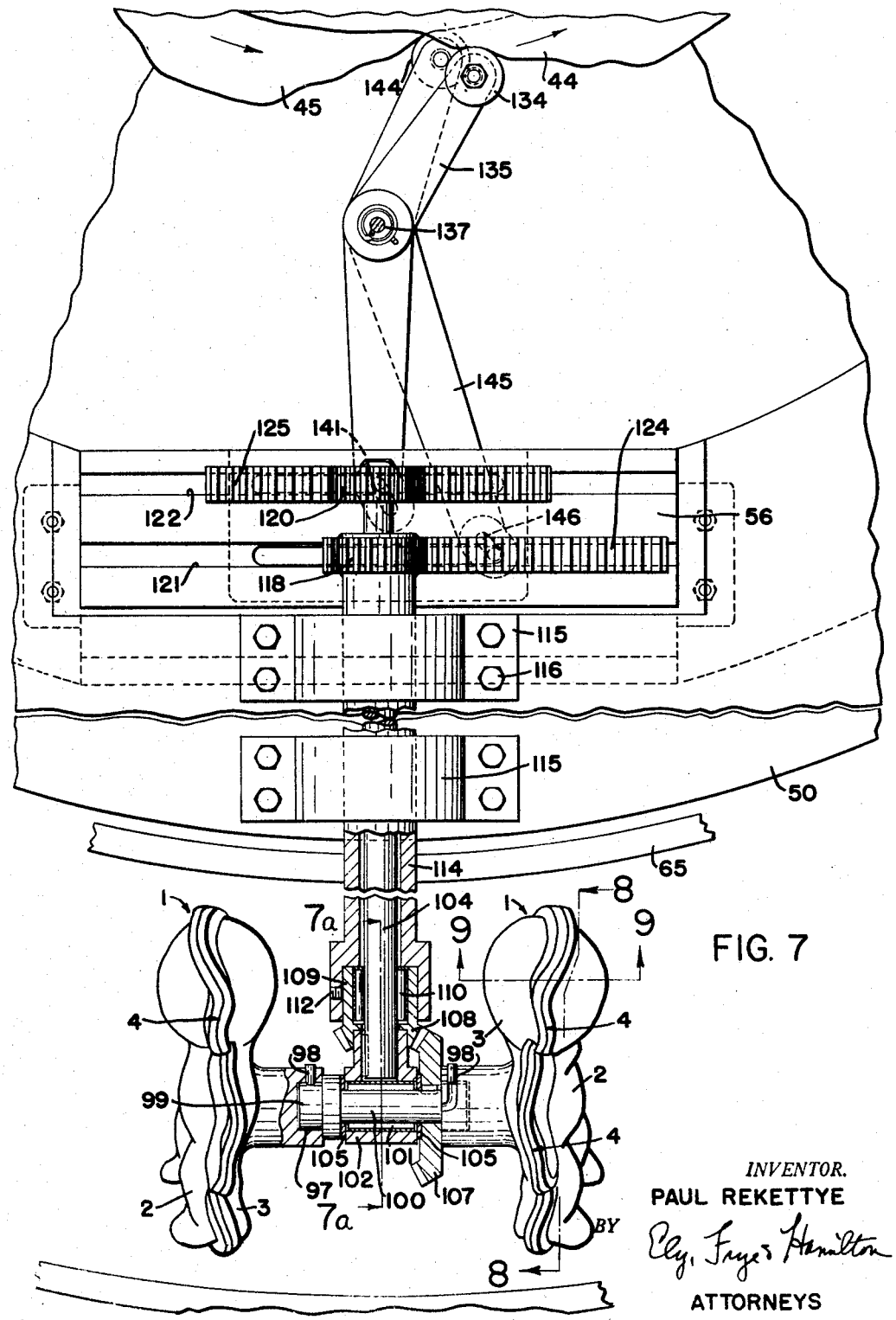
Fig. 7 is an enlarged detail of a single mold rotating unit.

Rotation of the molds or molds on the major axis is transmitted from the rotating cam 44 by means of a roller 134 as it bears against the edge of the moving cam 44, as shown in Fig. 7. This roller is rotatably mounted on the inner end of a lever arm 135, the center of which is pivotally mounted on a pin 137 set in the turntable 50. A coil spring 138, one end of which is set in the post and the other end of which is set in the arm 135, keeps the roller 134 against the undulatory edge of the cam 44. The outer end of the arm 135 is extended into a large recess 140 in the block 56 below the racks 124 and 125, where it is provided with a slot 141 which is received over the pin 131.

Rotation of the mold or molds on the minor axis is transmitted from the rotating cam 45 by means of a roller 144 as it bears against the edge of the cam 45 as shown in Fig. 7. This roller is rotatably mounted on the inner end of a lever arm 145 which is likewise pivotally mounted on the pin 137 below the lever arm 135 and separated from the turntable and the upper arm 135 by washers 147. A coil spring 148, one end of which is set in the turntable and the other end of which is set in the hub of the arm 145, keeps the roller 144 against the undulatory edge of the moving cam 45. The outer end of the arm 145 is extended into the recess 140 where it is provided with a slot 146 which is received over the pin 130.

It will be seen that by the design of the cams 44 and 45, any desired rotation or oscillation of the mold or molds can be obtained. The degree of rotation in one direction on either axis is limited only by the extent of the racks and the gear ratios in the mold unit. Reversals of rotation of the mold on either axis are obtained by reversing the movement of lever arms 135 and 145 about the pivot 137. The rotation of the turntable to advance the molds to new stations will either accelerate or decelerate the rotation of the molds momentarily, but that will not materially affect the casting operation.

Operation

Figure 1:
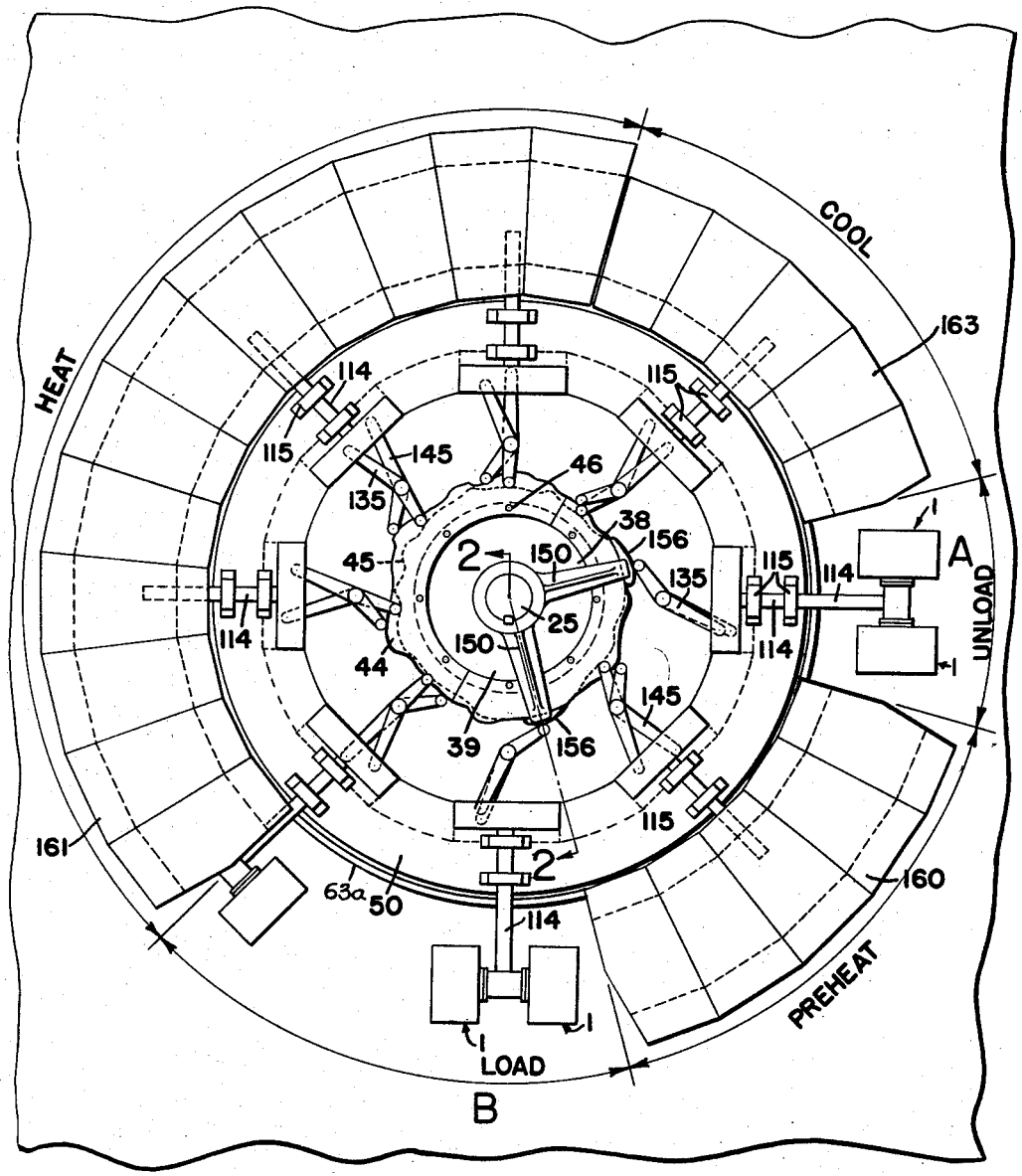
Fig. 1 is a plan view of a complete operative machine of the turntable type which is equipped with mechanism to carry out the process of the invention.

The turntable moves the mold units successively through a series of stations where the several operations take place. Fig. 1 shows an arrangement of stations which may be adopted although the sequence need not be followed in all details. At station A the molds may be opened to remove the finished goods, and if desired new molds substituted therefor. At station B the molds may be reopened for charging with the liquid plastisol. At these stations the mold unit should be stationary so that the operator can manipulate them, and for this purpose there is provided at each station a shunt or switch which removes the rollers 134 and 144 from the rotating cams. Such a device is shown in Figs. 1, 4 and 7 and consists of a pair of arms 150 which are carried upon a central hub 151 keyed to the top of the post 25 and supported on a washer 152 resting on the nut 42. These arms radiate in the direction of the stations A and B, where they are extended downwardly, as at 154, just outside of the cams 44 and 45. To each extension 154 is attached a rail 156 which lies in the plane of the cam 44 and a second rail 157 which lies in the plane of the cam 45. The rails are shaped so that as the turntable moves, the rollers 134 and 144 ride up over their respective cams, which arrests rotation of the molds so the mold unit is in position to be manipulated during the pause in the rotation of the turntable. If there are two molds in a unit, the operator may turn the mold unit by hand to place the molds in convenient position. On resumption of rotation of the turntable, the rollers return to engagement with their respective cams.

It is sometimes desirable to pre-heat the molds to the temperature at which the plastisol gels before loading the molds with a new charge. This is to prevent the formation of excessive rinds along the separation line 4 of the mold sections. For this purpose, a preheating tunnel 160 may be located between stations A and B in which the molds are raised to a temperature to partially gel the plastisol.

From the loading station, the molds are conducted through a tunnel 161 which is heated to a sufficient temperature to gel and fuse the plastisol over the surface of the rotating or oscillating mold. The extent of the fusing tunnel may be varied but in Fig. 1 it is shown as extending over somewhat less than 180° of the complete cycle.

After the plastisol has fused and set, it is necessary to cool the molds before opening them and removing the finished goods. For this purpose, a cooling tunnel 163 is provided which may be equipped with sprays to reduce the temperature of the molds to the point where it is safe to open the molds and remove the finished goods.

As noted above, the broad principles of the invention may be adopted and used on a single mold unit without all of the refinements of the apparatus. It will also be noted that other changes and modifications may be made in embodiments of the invention without departing from the features which distinguish this disclosure from the prior art. Where the term "rotation" is used in the claims, it will be understood that a complete or partial rotation may be covered thereby.

It will be seen that, both with respect to the apparatus and process, the direction, extent and speed of rotation upon either or both axes or any combination of any two features of rotation may be varied with respect to either or both axes of rotation, without interrupting the rotation of the mold on either axis. The turntable may be replaced by any other type of conveyor and when the term "conveyor" is used in the claims it will be understood to cover a turntable or any other type of movable conveyor.

What is claimed is:

1. Apparatus for casting articles against the inner surface of a hollow mold comprising, a base, a post extending from said base, a sleeve surrounding said post, means to rotate said sleeve, a member secured transversely of said sleeve, first and second cam means secured to the edge of said member, a turntable journaled transversely of said sleeve adjacent said member, a series of mold carrying units carried on said turntable radially of said sleeve, each unit including a rotatable outer shaft coaxially enclosing a rotatable inner shaft, mold mounting means journaled transversely of the outer end of said inner shaft, gear means connecting the outer end of said outer shaft and mold mounting means, a first pinion on the inner end of said outer shaft, a second pinion on the inner end of said inner shaft, a first rack slidable on said turntable transversely of said outer shaft in meshing engagement with said first pinion, a second rack slidable on said turntable transversely of said inner shaft in meshing engagement with said second pinion, individual follower means in continuous contact with said first and second cam means, and individual lever means extending between said follower means and said first and second racks whereby movement of said first cam means relative to a mold causes rotation of said outer shaft through said first pinion and rack and a similar relative movement of said second cam means causes rotation of said inner shaft through said second pinion and rack.

2. Apparatus for casting articles against the inner surface of a hollow mold comprising, a base, a post extending from said base, a sleeve surrounding said post, means to rotate said sleeve, a member secured transversely of said sleeve, first and second cam means secured to the edge of said member, a turntable journaled transversely of said sleeve adjacent said member, a series of mold carrying units carried on said turntable radially of said sleeve, each unit including coaxial inner and outer shafts, a mold carrier attached to said inner shaft and rotatable thereby on one axis, driving connections between the outer shaft and carrier to rotate the carrier on an axis divergent to the first said axis, a first pinion on the inner end of said outer shaft, a second pinion on the inner end of said inner shaft, a first rack slidable on said turntable transversely of said outer shaft in meshing engagement with said first pinion, a second rack slidable on said turntable transversely of said inner shaft in meshing engagement with said second pinion, individual follower means in continuous contact with said first and second cam means, and individual lever means extending between said follower means and said first and second racks whereby movement of said first cam means relative to a mold causes rotation of said outer shaft through said first pinion and rack and a similar relative movement of said second cam means causes rotation of said inner shaft through said second pinion and rack.

3. An apparatus for casting articles against the inner surface of a hollow mold comprising, a sleeve member and a series of mold carrying units arranged radially thereof, means to move said sleeve member relative to said mold carrying units, each mold carrying unit including a pair of coaxial shafts, a mold carrier attached to the outer end of one shaft and rotatable thereby on one axis and driving connections between the outer end of the other shaft and the carrier to rotate the carrier on an axis divergent to said first axis, individual cam means secured to said sleeve radially thereof, and individual linkage means extending between said cam means and the inner ends of said shafts whereby movement of said sleeve relative to said mold carrying units causes a movement of said mold carrier on said different axes.

4. An apparatus for rotationally casting hollow articles from thermoplastic resins in molds comprising, a rotatable sleeve, pairs of coaxial shafts arranged radially of said sleeve, a mold carrier attached to the outer end of one of each coaxial shafts and rotatable thereby on one axis, driving connections between the outer end of the other one of each coaxial shafts and the carrier to rotate the carrier on an axis divergent to the first said axis, a first cam means secured radially of said sleeve, a series of first follower means contacting said first cam means, a first pinion on the inner end of one of each coaxial shafts, a first rack and lever means between each first pinion and a first follower means, a second cam means secured radially of said sleeve adjacent said first cam means, a series of second follower means contacting said second cam means, a second pinion on the inner end of the other one of each coaxial shafts, and a second rack and lever means between each second pinion and a second follower means, said pinions, racks, follower means and lever means imparting oscillatory motion to the respective shafts in accordance with the configuration of said cam means.

5. An apparatus for rotationally casting hollow articles from thermoplastic resins in molds comprising, a conveyor, at least one pair of coaxial shafts on said conveyor, a mold carrier attached to one shaft and rotatable thereby on one axis, drive means between the other shaft and the carrier to rotate the carrier on an axis divergent to said first axis, cams adjacent the ends of said shafts opposite said carrier, a first driving connection between one of said cams and one of said coaxial shafts and a second driving connection between another cam and the other coaxial shaft, whereby relative movement of said conveyor and cams causes movement of said mold carrier on said different axes.

6. An apparatus for rotationally casting hollow articles from thermoplastic resins in molds comprising, a conveyor, at least one pair of coaxial inner and outer shafts on said conveyor, a mold carrier attached to an inner shaft and rotatable thereby on one axis, driving means between the outer shaft and carrier to rotate the carrier on an axis divergent to the first said axis, cams adjacent the ends of said shafts opposite said carrier, a first driving connection between one cam and an inner shaft and a second driving connection between another cam and an outer shaft, whereby relative movement of said conveyor and cams causes movement of said mold carrier on said different axes.

(References on following page)

References Cited in the file of this patent

UNITED STATES PATENTS

| | | |
|---|---|---|
| 947,405 | Baker et al. | Jan. 25, 1910 |
| 1,080,224 | Latcher | Dec. 2, 1913 |
| 1,501,338 | Henry | July 15, 1924 |
| 1,812,242 | Jensen | June 30, 1931 |
| 2,060,962 | Twiss | Nov. 17, 1936 |
| 2,222,266 | Rubissow | Nov. 19, 1940 |
| 2,233,555 | Reisinger | Mar. 4, 1941 |
| 2,353,256 | Maywald | July 11, 1944 |
| 2,465,819 | Rubissow | Mar. 27, 1948 |
| 2,573,693 | De Bell | Nov. 6, 1951 |
| 2,603,836 | Rempel | July 22, 1952 |
| 2,681,472 | Rempel | June 22, 1954 |
| 2,696,024 | Mobley et al. | Dec. 7, 1954 |
| 2,740,176 | Duval | Apr. 3, 1956 |

FOREIGN PATENTS

| | | |
|---|---|---|
| 558,131 | Great Britain | Dec. 22, 1943 |

UNITED STATES PATENT OFFICE

CERTIFICATE OF CORRECTION

Patent No. 2,893,057                                                  July 7, 1959

Paul Rekettye

It is hereby certified that error appears in the printed specification of the above numbered patent requiring correction and that the said Letters Patent should read as corrected below.

Column 3, line 4, for "recesses" read -- reaches --; column 5, line 24, for "plastosol" read -- plastisol --; line 69, for "molds", first occurrence, read -- mold --; column 8, line 10, for "artices" read -- articles --.

Signed and sealed this 10th day of November 1959.

(SEAL)
Attest:

KARL H. AXLINE
Attesting Officer

ROBERT C. WATSON
Commissioner of Patents